No. 774,337. PATENTED NOV. 8, 1904.
P. PATTERSON.
METHOD OF MAKING LAPWELD TUBING.
APPLICATION FILED FEB. 25, 1902.
NO MODEL.
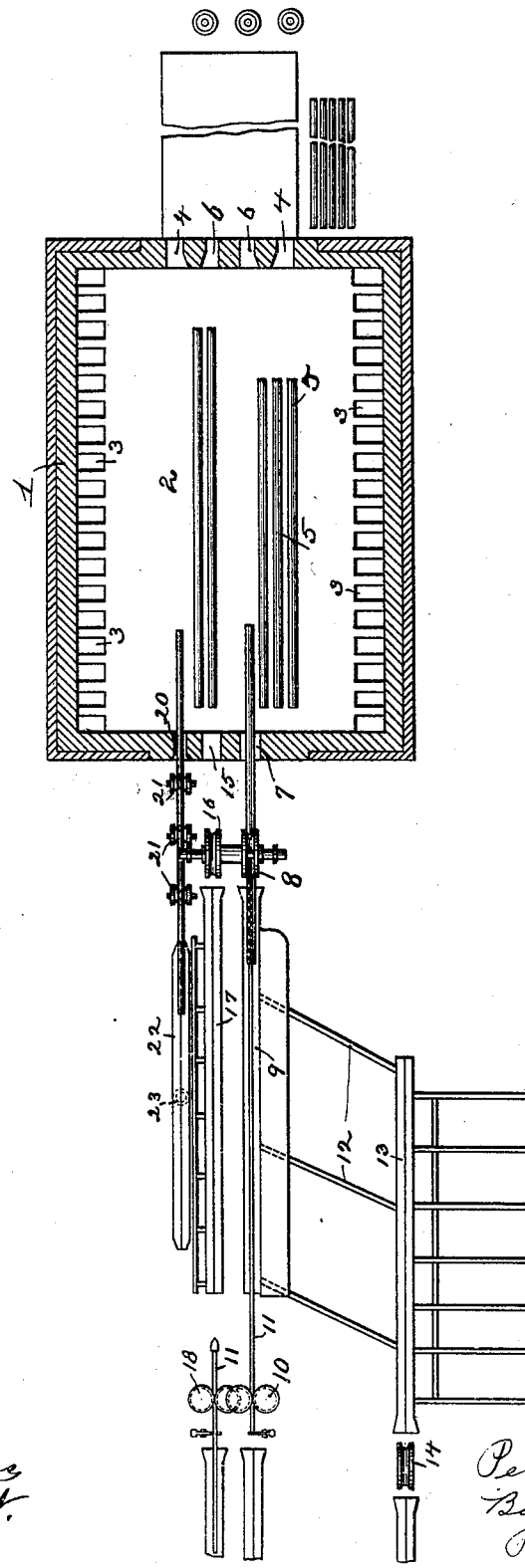
Witnesses:
Inventor:
Peter Patterson
By Kay & Totten
Attorneys.

No. 774,337.                                                                                    Patented November 8, 1904.

UNITED STATES PATENT OFFICE.

PETER PATTERSON, OF McKEESPORT, PENNSYLVANIA, ASSIGNOR TO NATIONAL TUBE COMPANY, OF PITTSBURG, PENNSYLVANIA, A CORPORATION OF NEW JERSEY.

METHOD OF MAKING LAPWELD-TUBING.

SPECIFICATION forming part of Letters Patent No. 774,337, dated November 8, 1904.

Application filed February 25, 1902. Serial No. 95,501. (No model.)

*To all whom it may concern:*

Be it known that I, PETER PATTERSON, a resident of McKeesport, in the county of Allegheny and State of Pennsylvania, have invented a new and useful Improvement in Methods of Making Lapweld-Tubing; and I do hereby declare the following to be a full, clear, and exact description thereof.

My invention relates to a method of manufacturing lapweld-tubing, and more especially to the manufacture of boiler-tubes and other lapweld-tubing which are given a second run through a furnace and welding apparatus.

The object of my invention is to provide a method of manufacturing such tubing whereby the output of the furnace is increased and the cost of operating the same reduced.

In the manufacture of boiler and similar tubes the practice heretofore has been to form the same in the ordinary way of making lapweld-tubing—that is, from the bent-up skelp, which was charged into a heating-furnace, raised to a welding heat, and then pushed out of the furnace through welding-rolls and over a ball. This operation completes the usual lapweld-tubing; but for use as boiler-tubes and elsewhere where greater strength is required it is necessary to give such tubes a second run through the furnace and welding apparatus. The usual practice is to operate the furnace for half a day on the first run, the tubes as they are welded being laid aside and permitted to cool, and then for the other half of the day the furnace is operated on the second run—that is, the welding-rolls are readjusted to the necessary size and the previously-welded tubes are charged into the furnace, again raised to a welding heat and pushed out of the same and through the welding-rolls and over the ball. According to this practice the output of the furnace is limited to half a day's run and is about six hundred tubes per day, this being the number which can be given the first run in the forenoon and the second run in the afternoon. The only way of increasing this output under the old method would be by having two furnaces, one for giving the first run and another for giving the second run, the tubes being transferred from the first furnace to the second. This, however, would necessitate the building of two furnaces and providing independent charging and welding apparatus for each of said furnaces, besides requiring two complete crews of eleven men each, so that while by means of such furnaces the output of the present single furnace would be practically doubled the expense would also be practically doubled, and no saving would result.

The object of my invention is to provide a method of forming lapweld-tubing which must be given two runs, whereby the output can be increased without a corresponding increase in cost.

To this end it consists in forming the lapweld tubing in the ordinary way and then, preferably, before the same has cooled recharging the welded tube into the same furnace, preferably into the front end thereof, and after reheating the same giving it a second run through welding-rolls.

My invention also comprises details of arrangement, as will hereinafter appear.

The accompanying drawing is a plan view showing diagrammatically apparatus for carrying out my invention.

The furnace employed may be of any approved type, but preferably being heated by gas and of the regenerative type. Such a furnace is shown at 1, and it has the usual side, end, and top walls and is provided with a hearth 2 and regenerator-ports 3. The hearth 2 will be made somewhat wider than in the ordinary lapweld-furnace, so as to contain in addition to the necessary number of skelp also a number of tubes for reheating preparatory to being given the second run. This furnace is provided at its rear end with openings 4, through which the skelp 5 are charged into the furnace, said skelp preferably being charged in on one side of the hearth and as they heat are rolled over toward the center of the furnace and a fresh skelp charged into the vacant space, as is now the custom. The rear of the furnace is also provided with openings 6 for insertion of a suitable bar or fork for pushing the skelp out of the front end of the furnace and into the welding-rolls. The front end of the furnace is provided with a withdrawing-opening 7, through which the heated skelp are pushed on their way to the welding-rolls 8. These rolls are or may be of any desired construction and driven in any suitable way, and in line therewith is the usual trough 9 for receiving the tube and the rolls 10 for projecting and withdrawing the mandrel-bar 11, which supports the ball over which the skelp is welded. At one side of the welding-trough 9 are inclined ways 12, leading to the sizing-trough 13, which is in line with the sizing-rolls 14. All of these parts are or may be of the usual construction and form no part of my invention, and the precise arrangement shown is illustrative merely.

In carrying out my invention the front end of the furnace will be provided with a second withdrawing-opening 15, and in line therewith will be another pair of welding-rolls 16, trough 17, mandrel-bar-operating rolls 18, and mandrel-bar and ball, all of which are or may be precisely the same as the welding rolls, trough, and mandrel first described. I prefer, however, to form the rolls 16 integral with or on the same shaft with the rolls 8, so as to necessitate only a single pair of bearings and housings for both sets of rolls and enabling the same to be set close together. In the front end of the furnace at the side of the withdrawing-opening 15 is the recharging-opening 20, and in front thereof a series of rollers 21, which may be power-driven by any suitable mechanism, and in line with these is a trough 22, which is mounted in any suitable way, so that it can be reversed end for end— as, for instance, by being connected at its middle to the upper end of the piston-rod of a hydraulic cylinder 23, whereby the trough can be raised up and then swung around end for end, as is now well understood.

The foregoing are all of the essential parts of apparatus necessary for carrying into effect my invention, and in the practice thereof the skelp 5 are charged through the opening 4 and as they heat are progressively rolled over toward the center of the furnace until in line with the withdrawing-opening 7. When the edges of the skelp are raised to a good welding heat, they are pushed out in succession through said opening 7 and into the welding-rolls 8, through which they are passed over the ball in the usual way, passing over the mandrel-bar 11 in the trough 9. As soon as the tube has cleared the welding-rolls, the mandrel-bar will be withdrawn in the usual way and then said tube is transferred by any suitable transferring devices or mechanisms (not shown) sidewise over the trough 17 and deposited in the charging-trough 22. As the front end of the tube is usually somewhat deformed or mutilated, it is desirable to reverse the tube end for end before recharging into the furnace. Furthermore, by reason of the accumulation of cinder on the ball the walls of the tube are usually somewhat thinner at the rear end than at the forward end, giving a slight taper thereto; but by giving the tube a second run in the direction opposite to that in which it travels during the first run this tapering effect is almost entirely overcome. The trough 22 will therefore be reversed end for end, as above described, and the tube will then be pushed into the furnace through the charging-opening 20, and as it heats it will be moved over toward the center of the furnace until in line with the withdrawing-opening 15. As soon as again raised to a good heat it is pushed out of the furnace through the opening 15 and through the rolls 16 and over the ball in the usual way. It is then transferred to the sizing-trough 13 and goes to the sizing-rolls and thence to the straightening-rolls according to the usual practice.

By my method the tube is recharged into the furnace before it has lost an appreciable amount of heat, so that very little heat is necessary to again bring it to proper welding temperature. As a consequence the furnace can be operated at but a slight cost over the cost of operating the present furnaces for giving a single run. Furthermore, only three workmen will be required in addition to the eleven usually employed for a single crew and the output of the furnace will be nearly doubled. The product is therefore greatly cheapened.

What I claim as my invention, and desire to secure by Letters Patent, is—

1. The method of making lapweld-tubing, which consists in charging in succession a series of bent-up skelp into a furnace on one side of the hearth thereof, gradually moving the same over toward the center of the furnace, withdrawing the same in succession from the furnace and passing them through welding-rolls and over a mandrel, recharging them in succession into the same furnace and on the opposite side of the hearth thereof, again gradually moving the same over toward the center of the furnace, and again withdrawing the same in succession from the furnace and giving them a second pass through welding-rolls and over a mandrel.

2. The method of making lapweld-tubing, which consists in charging in succession a series of bent-up skelp into a furnace through the rear end thereof and on one side of the hearth, gradually moving the same over toward the center, withdrawing the same in succession through the front end of the furnace and passing them through welding-rolls and over a mandrel, transferring them to the other side of the same furnace and recharging them in succession into the furnace through the front end thereof and onto the same hearth, again gradually moving the same over toward the center of the furnace, and again withdrawing the same in succession through the front end of the furnace and giving them a second pass through welding-rolls and over a mandrel.

3. The method of forming lapweld-tubing, which consists in charging in succession a series of bent-up skelp into a furnace, raising their edges to a welding heat, withdrawing the same in succession through the front end of the furnace and passing them through welding-rolls and over a mandrel, reversing the same end for end, recharging them in succession while still at a high heat into the furnace through the front end thereof and reheating the same, and then again withdrawing them in succession through the front end of the furnace and giving them a second pass through welding-rolls and over a mandrel and in the opposite direction from that in which they were given the first welding pass.

4. The method of forming lapweld-tubing, which consists in charging in succession a series of bent-up skelp into a furnace through the rear end thereof, gradually moving the same over toward the center of the furnace, withdrawing the same in succession through the front end of the furnace and passing them through welding-rolls and over a mandrel, reversing the same end for end, charging them in succession into the opposite side of the same furnace through the front end thereof, again moving the same laterally toward the center of the furnace, and again withdrawing the same in succession through the front of the furnace and giving them a second pass through welding-rolls and over a mandrel and in the opposite direction from that in which they were given the first welding pass.

In testimony whereof I, the said PETER PATTERSON, have hereunto set my hand.

PETER PATTERSON.

Witnesses:
F. W. WINTER,
ROBERT C. TOTTEN.